United States Patent [19]

Holliger et al.

[11] 4,150,942
[45] Apr. 24, 1979

[54] 1:2 METAL COMPLEXES OF AZO COMPOUNDS HAVING 1-HYDROXYNAPHTHALENE-3-SULFONIC ACID COUPLING COMPONENT RADICALS AT LEAST ONE OF WHICH IS A DISAZO COMPOUND

[75] Inventors: Herbert Holliger, Allschwil; Heinz Wicki, Basel, both of Switzerland

[73] Assignee: Sandoz Ltd., Basel, Switzerland

[21] Appl. No.: 801,397

[22] Filed: May 27, 1977

[30] Foreign Application Priority Data

May 31, 1976 [CH] Switzerland .................. 6812/76

[51] Int. Cl.² .................. C09B 45/26; C09B 45/30; C09B 45/32; D06P 3/32
[52] U.S. Cl. .................. 8/26; 8/13; 260/145 A; 260/148
[58] Field of Search .................. 8/26; 260/148, 145 A, 260/145 B

[56] References Cited

U.S. PATENT DOCUMENTS

| | | | |
|---|---|---|---|
| 1,873,278 | 8/1932 | Brightman | 260/190 X |
| 2,012,779 | 8/1935 | Straub et al. | 260/145 A |
| 2,775,581 | 12/1956 | Neier et al. | 260/145 A |
| 2,933,488 | 4/1960 | Biedermann et al. | 260/145 A |
| 2,938,490 | 4/1960 | Biedermann et al. | 260/145 A |
| 3,457,252 | 7/1969 | Meininger | 260/148 |
| 3,525,732 | 8/1970 | Beffa et al. | 260/145 A |
| 3,756,771 | 9/1973 | Beffa | 260/145 A |

FOREIGN PATENT DOCUMENTS

| | | | |
|---|---|---|---|
| 198397 | 6/1958 | Austria | 260/145 A |
| 731771 | 2/1943 | Fed. Rep. of Germany | 260/151 |
| 852484 | 2/1940 | France | 260/199 |
| 851861 | 10/1960 | United Kingdom | 260/145 B |
| 1080056 | 8/1967 | United Kingdom | 260/145 A |
| 1201560 | 8/1970 | United Kingdom | 260/145 A |

OTHER PUBLICATIONS

Meininger et al., Chemical Abstracts, vol. 75, #89317c (1971).

Primary Examiner—Floyd D. Higel
Attorney, Agent, or Firm—Gerald D. Sharkin; Richard E. Vila; Melvyn M. Kassenoff

[57] ABSTRACT

1:2 Metal complexes of the formula

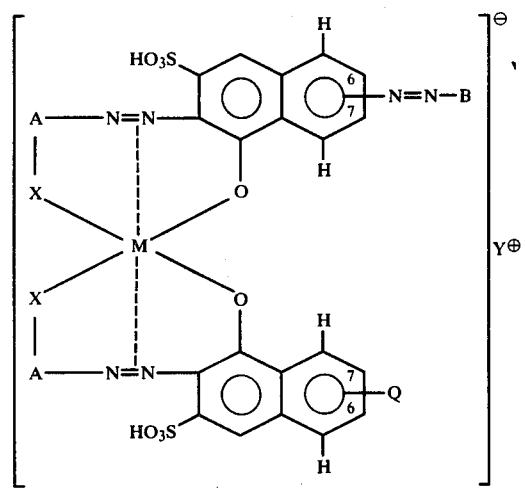

in which
each A is, independently, a 1,2-phenylene or 1,2-naphthylene diazo component radical which is unsubstituted or substituted by up to two substituents selected from $(C_{1-4})$alkyl, $(C_{1-4})$alkoxy, halogen, nitro, sulpho and carboxy,
Q is a group of the formula —N═N—B or —NHR₃,
each B is, independently, a coupling component radical of the aliphatic series containing an enolic hydroxy group, a coupling component radical of the naphthol series free of amino groups or a coupling component,
each X is, independently, —O— or —COO—, radical of the benzene series having at least one phenolic hydroxy group and/or a group of the formula —NR₁R₂, with the proviso that when Q is —NHR₃, B is a radical of the benzene series,
R₁ is hydrogen, $(C_{1-6})$alkyl or $(C_{2-4})$hydroxyalkyl,
R₂ is hydrogen, $(C_{1-6})$alkyl, phenyl, $(C_{1-6})$alkylphenyl or $(C_{2-4})$hydroxyalkyl,
R₃ is R'-CO-, wherein R' is hydrogen or alkyl,
M is a 1:2 metal complex forming metal, and
Y⊕ is hydrogen or an equivalent of a non-chromophoric cation, and mixtures thereof, which complexes are in free acid or salt form and are useful as dyestuffs for dyeing substrates dyeable with anionic dyes, e.g., natural and regenerated cellulose, paper, polyurethanes, high molecular weight polymers such as polypropylene modified to contain basic groups, natural and synthetic polyamides, anodized aluminum and, particularly, leather.

37 Claims, No Drawings

1:2 METAL COMPLEXES OF AZO COMPOUNDS HAVING 1-HYDROXYNAPHTHALENE-3-SULFONIC ACID COUPLING COMPONENT RADICALS AT LEAST ONE OF WHICH IS A DISAZO COMPOUND

The invention relates to 1:2 metal complex dyestuffs, their production and use.

Accordingly, the present invention provides 1:2 metal complexes of the formula

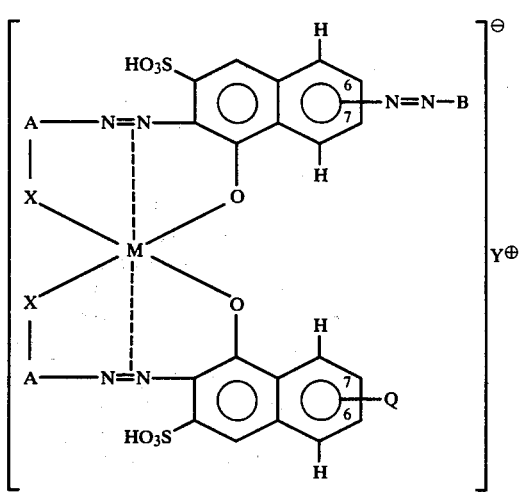

in which
each A is, independently, a 1,2-phenylene or 1,2-naphthylene diazo component radical which is unsubstituted or substituted by up to two substituents selected from ($C_{1-4}$)alkyl, ($C_{1-4}$)alkoxy, halogen, nitro, sulpho and carboxy, each X is, independently, —O— or —COO—, Q is a group of the formula —N=N—B or —NHR$_3$, each B, independently, is a coupling component radical of the aliphatic series containing an enolic hydroxyl group, a coupling component radical of the naphthol series which is free from amino groups or a coupling component radical of the benzene series having at least one phenolic hydroxy group and/or a group of the formula —NR$_1$R$_2$, with the proviso that when Q is —NHR$_3$, B is a radical of the benzene series, R$_1$ is hydrogen, ($C_{1-6}$)alkyl or ($C_{2-4}$)-hydroxyalkyl, R$_2$ is hydrogen, ($C_{1-6}$)alkyl, phenyl, ($C_{1-6}$)alkylphenyl or ($C_{2-4}$) hydroxyalkyl, R$_3$ is R'—CO—, wherein R' is hydrogen or alkyl, M is a 1:2 metal complex forming metal, and Y$^\oplus$ is hydrogen or an equivalent of a non-chromophoric cation, and mixtures thereof,
which complexes are in free acid or salt form.

It will be appreciated that the radical B may bear substituents which are common in the chemistry of metallized azo dyestuffs. However, substituents or combinations of substituents which are known to deleteriously affect the dyeing properties of the compounds and substituents or combinations thereof which are known to present steric or stability problems should not, of course, be present.

Where A is a radical of the 1,2-naphthylene series, such radical preferably bears at least one sulpho group.

By halogen as used herein is meant chlorine, bromine or fluorine.

Preferably, any halogen is chlorine.

Any alkyl or alkoxy substituent on A preferably contains 1 or 2 carbon atoms, with methyl and methoxy being especially preferred.

Each X is preferably —O—.

Preferably, each group —A—X— is, independently, —A$_1$—O— where —A$_1$—O— is a radical of formula a$_1$ or a$_2$

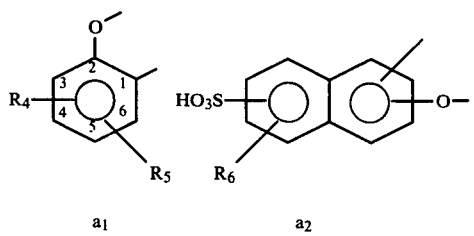

in which
R$_4$ is hydrogen, chlorine, ($C_{1-4}$)alkyl, ($C_{1-4}$)alkoxy, —SO$_3$H or nitro, R$_5$ is hydrogen, chlorine, ($C_{1-4}$)alkyl, —SO$_3$H or nitro, and R$_6$ is hydrogen or nitro.

Preferably, when one of R$_4$ and R$_5$ is sulpho the other of R$_4$ and R$_5$ is other than sulpho.

Preferably, R$_4$ is R$_4'$, where R$_4'$ is hydrogen, nitro or sulpho, any nitro or sulpho preferably being in the 3-position.

R$_5$ is preferably R$_5'$, where R$_5'$ is hydrogen, methyl, chlorine, nitro or sulpho, any methyl, chlorine or sulpho preferably being in the 5-position and any nitro preferably being in the 4- or 5-position, it being preferably only in the 4-position when R$_4'$ is hydrogen.

More preferably each group —A$_1$—O— is, independently, a radical of formula a$_1$.

Preferably, the radicals a$_1$ are the radicals of 2-hydroxyphenyl, 2-hydroxy-4- or -5-nitrophenyl, 2-hydroxy-5-sulphophenyl, 2-hydroxy-5-chlorophenyl, 2-hydroxy-5-methylphenyl, 2-hydroxy-3-sulpho-5-nitrophenyl, 2-hydroxy-3-nitro-5-sulphophenyl, 2-hydroxy-3,5-dinitrophenyl and 2-hydroxy-3-sulpho-5-chlorophenyl. Preferred radicals of a$_2$ are those of 2-hydroxy-4-sulphonaphthyl-(1) and 2-hydroxy-4-sulpho-6-nitronaphthyl-(1).

Where B is a coupling component of the aliphatic series it is preferably a coupling component of the acetoacetyl series linked to a ($C_{1-4}$)alkyl, ($C_{1-4}$)alkoxy or arylamino group.

Where B is a coupling component radical of the benzene series bearing substituents in addition to a phenolic hydroxy group and/or a group of the formula —NR$_1$R$_2$, such substituents are preferably selected from ($C_{1-4}$)alkyl, ($C_{1-4}$)alkoxy, halogen (preferably chlorine), acetylamino and sulpho.

Where B is a coupling component radical of the naphthol series, it preferably bears at least one sulpho group.

Preferably any alkyl as R$_1$ and/or R$_2$ contains 1 or 2 carbon atoms. Any hydroxyalkyl as R$_1$ and/or R$_2$ preferably contains 2 or 3 carbon atoms. Preferred —NR$_1$R$_2$ groups are —NH$_2$, mono-dimethylamino, mono-diethylamino, mono-diethanolamino, mono-diisopropanolamino, phenylamino and tolylamino.

More preferred —NR$_1$R$_2$ groups are —NH$_2$, phenylamino and tolylamino.

The preferred radicals B are of the formulae b$_1$, b$_2$, b$_3$ and b$_4$,

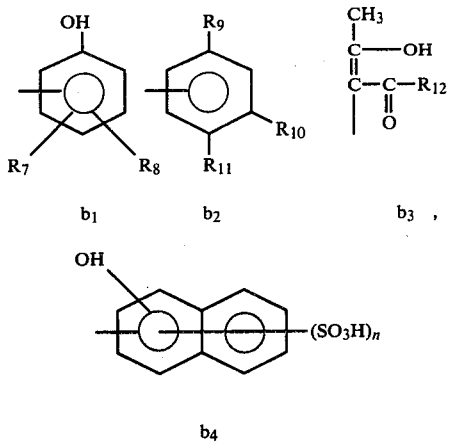

b$_1$     b$_2$     b$_3$ ,

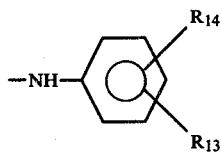

b$_4$ in which
R$_7$ is hydrogen, (C$_{1-4}$)alkoxy, (C$_{1-4}$)alkoxy, chlorine or acetylamino,
R$_8$ is hydrogen, chlorine or (C$_{1-4}$)alkoxy,
R$_9$ is hydroxy or —NH$_2$,
R$_{10}$ is hydroxy, —NH$_2$, anilino or toluidino,
R$_{11}$ is hydrogen, —SO$_3$H or (C$_{1-4}$)alkyl,
R$_{12}$ is (C$_{1-4}$)alkyl, C$_{1-4}$ alkoxy or $$-NH-\underset{R_{13}}{\overset{R_{14}}{\bigcirc}}$$

R$_{13}$ is hydrogen, (C$_{1-4}$)alkyl, C$_{1-4}$ alkoxy, chlorine or —SO$_3$H,
R$_{14}$ is hydrogen, chlorine or (C$_{2-4}$)alkyl, and
n is 0, 1 or 2.

R$_7$ is preferably R$_7'$, where R$_7'$ is (C$_{1-4}$)alkyl, (C$_{1-4}$)alkoxy, chlorine or acetylamino, preferably para to the hydroxy group. More preferably R$_7$ is R$_7''$, where R$_7''$ is methyl or chlorine in the position para to the hydroxy group.

R$_8$ is preferably R$_8'$, where R$_8'$ is hydrogen, chlorine or methyl, R$_8'$ preferably being ortho to the hydroxy group.

R$_{10}$ is preferably R$_{10}'$, where R$_{10}'$ is —NH$_2$, anilino or toluidino.

R$_{11}$ is preferably hydrogen or sulpho, especially hydrogen.

R$_{13}$ is preferably R$_{13}'$, where R$_{13}'$ is hydrogen, methyl, methoxy or chlorine, with hydrogen being especially preferred.

R$_{14}$ is preferably hydrogen.

n is preferably 0 or 1, more preferably 1.

Preferably any alkyl or alkoxy group in the radical B contains 1 or 2 carbon atoms, with methyl and methoxy being most preferred.

Preferably B is B$_1$, where B$_1$ is a radical of formula b$_1$, b$_2$ or b$_3$. More preferably B is B$_1'$, where B$_1'$ is a radical of formula b$_1$ or b$_3$. Most preferably B is B$_1''$ where B$_1''$ is a radical of formula b$_1$. The radical —N=N—B is preferably bound to the 7-position.

Preferred radicals of formula b$_1$ are radicals of 4-methylphenol, 4-chlorophenol, 2,4-dimethylphenol and 2,4-dichlorophenol.

Preferred radicals of formula b$_2$ are radicals of m-aminophenol, m-phenylenediamine, 2,4-diaminotoluene, 2-(3'-hydroxyphenylamino)toluene and 2,4-diaminobenzenesulphonic acid.

Preferred radicals of formula b$_3$ are radicals of acetoacetic acid, methyl ester acetoacetic acid ethyl ester and acetoacetanilide.

Preferred radicals of formula b$_4$ are radicals of β-naphthol, 2-hydroxynaphthalene-4-, -6- or -7-sulphonic acid, 2-hydroxynaphthalene-3,6-disulphonic acid and 1-hydroxynaphthalene-4-sulphonic acid.

Preferably, R$_3$ is R$_3'$, where R$_3'$ is R''—CO— where R'' is hydrogen or (C$_{1-4}$)alkyl, with acetyl being especially preferred.

M is preferably M', where M' is chromium, cobalt or iron. More preferably M is M'', where M'' is chromium or cobalt, with chromium being especially preferred.

Representative of the complexes of formula I and mixtures of such complexes are those wherein B, or if Q is —N=N—B each B independently, is a radical of formula b$_1$, b$_2$, b$_3$ or b$_4$ and each —A—X— is independently a radical of formula a$_1$ or a$_2$ wherein not more than one of R$_4$ and R$_5$ on each radical of formula a$_1$ is sulfo. Of these, (i) those wherein R$_4$ is R$_4'$ and R$_5$ is R$_5'$ are preferred with those wherein any nitro or sulfo as R$_4'$ is in the 3-position, any methyl, chlorine or sulfo as R$_5'$ is in the 5-position and any nitro as R$_5'$ is in the 4- or 5-position being more preferred, and (ii) those wherein R$_7$ is R$_7'$, R$_8$ is R$_8'$, R$_{10}$ is R$_{10}'$, R$_{11}$ is hydrogen or sulfo, R$_{13}$ is R$_{13}'$, R$_{14}$ is hydrogen and n is 0 or 1 are also preferred with those of this subgroup wherein each —A—X— is independently a radical of formula a$_1$ being more preferred with those of this group wherein each B independently is a radical of formula b$_1$, b$_2$ or b$_3$, particularly b$_1$ or b$_3$, more particularly b$_1$, being most preferred.

Preferred complexes of formula I are those of formula I'

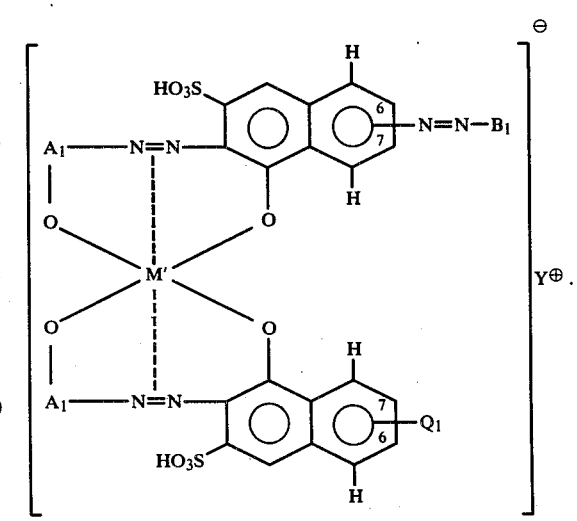

in which
each —A$_1$—O—, independently, is as defined above,
B$_1$ is as defined above, and $Q_1$ is —N=N—$B_2$ or —NHR$_3'$, with the proviso that $Q_1$ is other than —NHR$_3'$ when $B_1$ is a radical of formula $b_3$, $B_2$ has one of the significances given above for $B_1$, and $M'$, $R_3'$ and $Y^\oplus$ are as defined above, which complexes are in free acid or salt form. Mixtures of such complexes are also preferred.

Preferred complexes and mixtures of complexes of formula I' are those wherein each —$A_1$—O— is, independently, a radical of formula $a_1$, more preferably a radical of formula $a_1$ wherein $R_4$ is hydrogen, nitro or sulfo and $R_5$ is hydrogen, methyl, chloro, nitro or sulfo and $R_7$ is $C_{1-4}$alkyl, $C_{1-4}$alkoxy, chloro or acetamido, $R_8$ is hydrogen, chloro or methyl, $R_{10}$ is —NH$_2$, anilino or toluidino, $R_{11}$ is hydrogen or sulfo, $R_{13}$ is hydrogen, methyl, methoxy or chloro, and $R_{14}$ is hydrogen. Of these complexes and mixtures of complexes, those wherein (i) each of —N=N—$B_1$ and $Q_1$ is in the 7-position of the naphthalene ring to which it is attached, (ii) each —$A_1$—O— is the same and $Q_1$ is —NHR$_3'$ or —N=N—$B_2$ where $B_2$ is the same as $B_1$ or (iii) each —$A_1$—O— is the same, $B_1$ is a radical of formula $b_1$ and $Q_1$ is acetamido or —N=N—$B_2$ where $B_2$ is the same as $B_1$ are preferred.

More preferred complexes are those of formula I' in which the radicals —N=N—$B_1$ and $Q_1$ are bound to the 7-position, with those in which $M'$ is $M''$ being especially preferred.

Of the complexes and mixtures of formula I', those in which each —$A_1$—O— is the same and $Q_1$ is —NHR$_3'$, preferably —NHCOCH$_3$, or —N=N—$B_2$, where $B_2$ is the same as $B_1$, are even more preferred, with those where —$A_1$—O— is a radical of formula $a_1$, $B_1$ is a radical of formula $b_1$ and $Q_1$ is —N=N—$B_2$, where $B_2$ is identical to $B_1$ or $Q_1$ is —NHCOCH$_3$ being most preferred.

Preferably, $Y^\oplus$ signifies hydrogen or an alkali metal cation, an unsubstituted ammonium ion, a lower alkyl substituted ammonium ion or a hydroxy substituted lower alkyl ammonium ion. As examples of alkali metal cations may be given lithium, sodium and potassium.

The unsubstituted, lower alkyl substituted and hydroxyalkyl substituted ammonium ions may be represented by the formula $N^\oplus(R_x)_4$, where each $R_x$ is, independently, hydrogen, ($C_{1-3}$)alkyl or hydroxy ($C_{2-4}$)alkyl, for example triethylammonium, mono-, di- and tri-ethanolammonium and mono- di and triisopropanolammonium.

Examples of combinations of substituents or substituents which would present steric and/or stability problems are those where $R_x$ is identical and is hydroxyalkyl and those groups $N^\oplus(R_x)_4$ which contain a

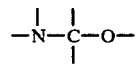

grouping.

The preferred cations as $Y^\oplus$ are sodium and potassium.

The sulpho groups in the molecule are preferably in salt form and may be in the same or different salt form. Each cation of a sulpho group may, independently, be any of those given above for $Y^\oplus$ and may be the same as or different from $Y^\oplus$. It will be appreciated that when Y is other than hydrogen the sulpho groups would generally be in salt form. The sulpho groups are preferably in sodium and/or potassium salt form.

The invention also provides a process for the production of 1:2 complexes of formula I or mixtures thereof comprising (a) metallizing a compound of formula Ia

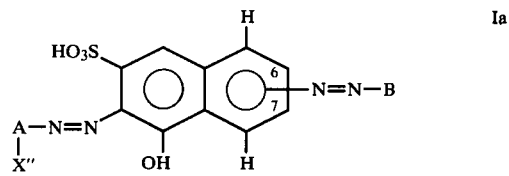

or a mixture thereof,
which compoud is in free acid or salt form,
and a compound of formula Ib,

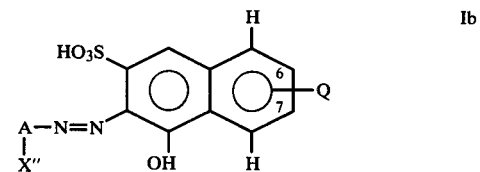

or a mixture thereof,
which compound is in free acid or salt form,
in which each X'', independently, is —OH, —COOH, ($C_{1-4}$)alkoxy or a halogen atom,
with a metal-donating compound,
to form a 1:2 metal complex of formula I, or (b) coupling the mono- or bis-diazo derivative of a compound of formula VIII,

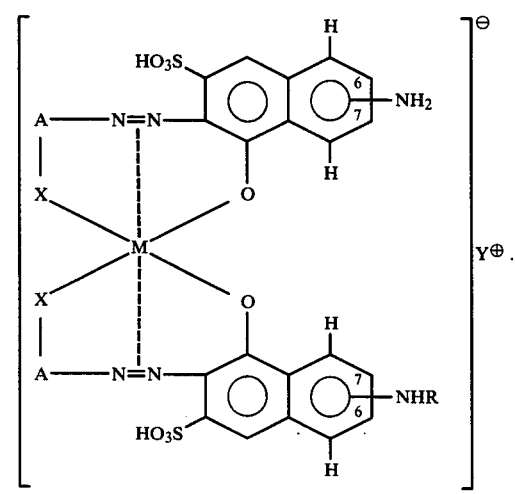

in which R is hydrogen or has one of the significances given above for $R_3$,
in free acid or salt form,
with a compound of formula III

H—B                         III in which B is as defined above, with the proviso that when R has one of the significances of $R_3$, B is a radical of a coupling component of the benzene series,
or a mixture thereof.

In process (a) preferably an equimolar amount of each of the azo compounds is employed. The metallization reaction may be carried out in accordance with conventional methods using salts of the appropriate metal.

Where X" is a halogen atom it is preferably chlorine. The halogen atom or alkoxy group as X" is converted to a hydroxy group in accordance with known methods during the metallization process.

It will be appreciated that the chromatization of the compounds of formulae Ia and Ib may be carried out as a two-step process, i.e. a 1:1 chromium complex is first prepared and then reacted with the second azo compound. Indeed, such procedure is advantageous when preparing asymmetric 1:2 metal complexes.

Further, it will be appreciated that, in process (a) where metallization of both components Ia and Ib is carried out simultaneously and Q is —NHR₃, a 1:2 complex or mixture of complexes of formula I may be obtained in admixture with a 1:2 complex of the monoazo compounds of formula Ib or a mixture thereof. The complexes of formula I or mixtures thereof may be separated therefrom or, alternatively, the said mixture may be employed as such as described hereafter for the complexes of formula I or mixtures thereof. In the said mixtures, M is preferably chromium.

The products of processes (a) and (b) may be isolated in conventional manner.

The coupling reactions of the process (b) may be carried out in accordance with known methods. The diazotization of the compound of formula VIII may also be carried out in accordance with known methods.

The disazo compounds of formula Ia and of formula Ib where Q is a group of the formula —N=N—B may be produced in analogy with known methods, for example, by coupling the diazo compound of an amine of formula II,

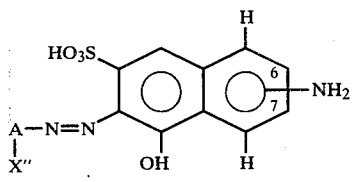

or a salt thereof,
with a compound of formula III,

H—B        III or by coupling the diazo compound of an amine of the formula

       IV with a coupling component of formula V,

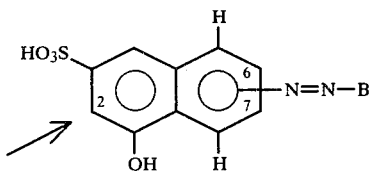

or a salt thereof,
and where necessary converting any halogen as X" into a hydroxy group.

The diazotization and coupling reactions may be carried out in accordance with known methods.

It will be appreciated that the coupling of the compound of formula III with the diazo compound of formula II may result in a mixture being obtained. Furthermore, mixtures may also be obtained by using mixtures of the starting materials.

The compounds of formula Ib wherein Q is —NHR₃ may be prepared by reacting a compound of formula II, or a salt thereof, with the functional derivative of a carboxylic acid or by coupling the diazo compound of an amine of formula IV,

       IV with a coupling component of formula VII,

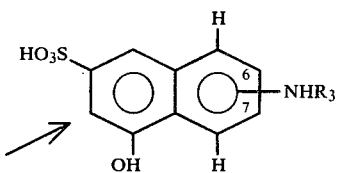

or a salt thereof,
and where necessary converting any halogen as X" into a hydroxy group.

Preferred functional derivatives of carboxyclic acids are halides, e.g. chlorides and esters.

The compounds of formula II may be prepared by coupling the diazo compound of an amine of the formula

with a compound of formula VI,

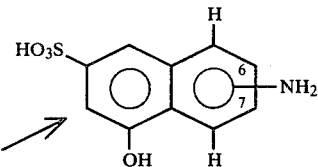

or a salt thereof,
and where necessary converting any halogen as X" into a hydroxy group.

The coupling reactions of the compounds of formulae V, VI and VII with the diazo derivative of the amine of the formula X"—A—NH₂ is conveniently carried out in alkaline medium, optionally in presence of a coupling accelerator.

The compounds of formula V may be prepared by coupling the diazo derivative of an amine of formula VI with a coupling component of formula III under weakly acid conditions.

The starting materials of formulae III, IV, VI and VII are either known or may be prepared by known methods from readily available starting materials.

The complexes and mixtures according to the present invention are useful for dyeing substrates dyeable with anionic dyestuffs. The complexes are also suitable for dyeing in combination with other dyestuffs.

Suitable substrates include natural and regenerated cellulose, for example paper, polyurethane, basically modified high polymers for example basically modified polypropylene, natural and synthetic polyamides, anodized aluminum and leather. The preferred substrates are natural and synthetic polyamides and leather, with leather being especially preferred.

grey shades having good light fastness. The dyestuff in the form of the free acid corresponds to the formula

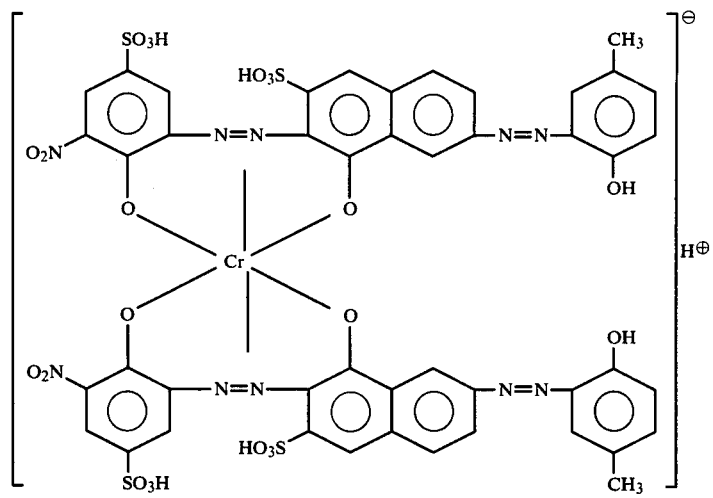

The substrate may be fibre, filament, yarn, fabric, felt, carpeting, knitted, woven, non-woven, half-finished or finished goods.

Dyeing may be carried out in accordance with known methods, for example, by employing exhaust dyeing, padding and printing methods using conventional amounts of dyestuffs, e.g. up to the saturation level of the substrate. The dyestuffs are also suitable for dyeing plastics in the mass. Furthermore, paper may be dyed in the stock or in sheet form. Leather which has been tanned by any known method, for example chrome tanned leather, may be dyed with complexes according to the present invention.

The dyestuffs according to the present invention, especially in alkali metal salt form, exhibit good water-solubility, are fast to alkali and give a good dyeing yield on leather. Dyeings on leather possess notable light fastness, resistance to migration on polyvinyl chloride and notable wat fastness.

The following Examples further serve to illustrate the invention. In the examples, unless otherwise stated, all parts and percentages are by weight and the temperatures are in degrees Centigrade. Parts by volume are to parts by weight as milliliters to grams.

EXAMPLE 1

48.4 Parts of the monoazo dye obtained by coupling in alkaline medium diazotized 2-amino-1-hydroxy-6-nitrobenzene-4-sulphonic acid with 2-amino-8-hydroxynaphthalene-6-sulphonic acid are suspended in 500 ml water, reacted with 11.5 parts chromium (III) acetate and stirred for 6 hours at 100° at a pH between 4 and 5. After cooling to 20°, 30 parts of 30% hydrochloric acid are added thereto and diazotization is effected by the dropwise addition of 25 parts by volume of a 4 N sodium nitrite solution. After diazotization is complete 11 parts p-cresol dissolved in 30 parts water and 5 parts of a 30% sodium hydroxide solution are added. Finally the pH is adjusted to 11 by the addition of a 30% sodium hydroxide solution and the reaction mixture is stirred for 1 hour. After the coupling reaction is completed the pH is adjusted to 7 with hydrochloric acid and the dyestuff is salted out with sodium chloride, filtered, dried and ground.

The dyestuff obtained in the form of the sodium salt is a black powder which gives dyeings on leather of In the above formula and in the formulae given in Examples 3 and 4 a proton is shown outside the brackets. However, when the compounds are in salt form it will be appreciated that these protons may, to a greater or lesser extent depending on the conditions employed, be replaced by the cations of the salt form of the sulpho groups. Such forms, of course, are part of the present invention.

EXAMPLE 2

A mixture of 24.2 parts of the dyestuffs obtained from the alkaline coupling of diazotized 2-amino-1-hydroxy-6-nitrobenzene-4-sulphonic acid with 2-amino-8-hydroxynaphthalene-6-sulphonic acid and 24.2 parts of the dyestuffs obtained from the alkaline coupling of diazotized 2-amino-1-hydroxy-4-nitrobenzene-6-sulphonic acid with 2-amino-8-hydroxynaphthalene-6-sulphonic acid is reacted with 11.5 parts of chromium(III)acetate as described in Example 1; the dyestuff mixture is subsequently diazotized and coupled with p-cresol. The dyestuff obtained is salted out with potassium chloride at pH 7, filtered, dried and ground. The product in the form of a mixture of sodium and potassium salt is a black powder which gives dyeings on leather of even grey shades having good light fastness.

EXAMPLE 3

(a) 40.4 Parts of the dyestuff obtained from the reaction of diazotized 2-amino-1-hydroxy-4-nitrobenzene with 2-amino-8-hydroxynaphthalene-6-sulphonic acid is stirred in 500 parts of water, adjusted to pH 11 with a 30% solution of sodium hydroxide and stirred for 1 hour. 40 parts of 30% hydrochloric acid are added thereto and diazotization is carried out at 10° by the dropwise addition of 25 parts by volume of a 4 N sodium nitrite solution. After diazotization is completed, 11 parts of p-cresol dissolved in 30 parts of water and 5 parts of 30% sodium hydroxide are added thereto. Subsequently, the suspension is adjusted to pH 11 with a 30% sodium hydroxide solution and is stirred for 1 hour at 20°. After coupling is completed the dyestuff is salted out with sodium chloride, filtered, washed and finally stirred in 500 parts of water. After the addition of 11.5 parts of chromium(III)acetate the suspension is stirred for 10 hours at 100°. When metallization is completed the dyestuff is salted out by the addition of sodium chloride, filtered, dried and ground. The dyestuff obtained in the form of the sodium salt gives dyeings on leather of even grey shades having good light fastness and in the form of the free acid corresponds to the formula

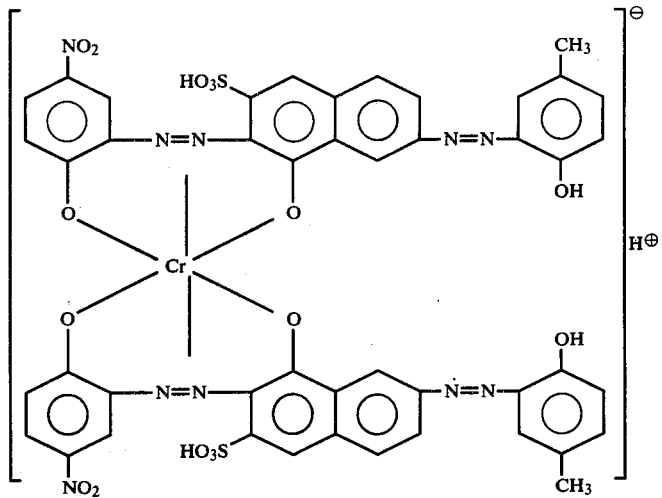

(b) The above mentioned dyestuff can also be obtained by metallising the monoazo dyestuff in accordance with the procedure given in Example 1, followed by diazotizating and coupling with p-cresol.

EXAMPLE 4

40.4 parts of the monoazo dye obtained by alkaline coupling of 2-amino-1-hydroxy-4-nitrobenzene with 2-amino-8-hydroxynaphthalene are stirred in 88 parts of water, reacted with 7.8 parts cobalt(II)sulphate dissolved in 50 parts water at 90°; the reaction mixture is adjusted to pH 10 with 30% sodium hydroxide solution and stirred for 2 hours at 90°. After completion of the metallization the dyestuff is salted out with sodium chloride and filtered. It is then stirred with 700 parts water and the pH is adjusted to 4 by the addition of 40 parts of 30% hydrochloric acid and the product is diazotized by the dropwise addition of 25 parts by volume of a 4 N sodium nitrite solution. After diazotization is completed the diazo suspension is added to 22.4 parts of 2-hydroxynaphthalene-6-sulphonic acid dissolved in 200 parts of water and 14 parts of 30% sodium hydroxide solution at 5° having a pH of 9, a pH of 9 being maintained by addition of 30% sodium hydroxide solution.

After coupling, the reaction mixture is adjusted to pH 7 by the addition of 30% hydrochloric acid and the dyestuff is salted out with sodium chloride and filtered. The product in the form of the sodium salt gives dyeings on leather of even grey shades having notable light fastness. The dyestuff, in the form of the free acid, corresponds to the formula

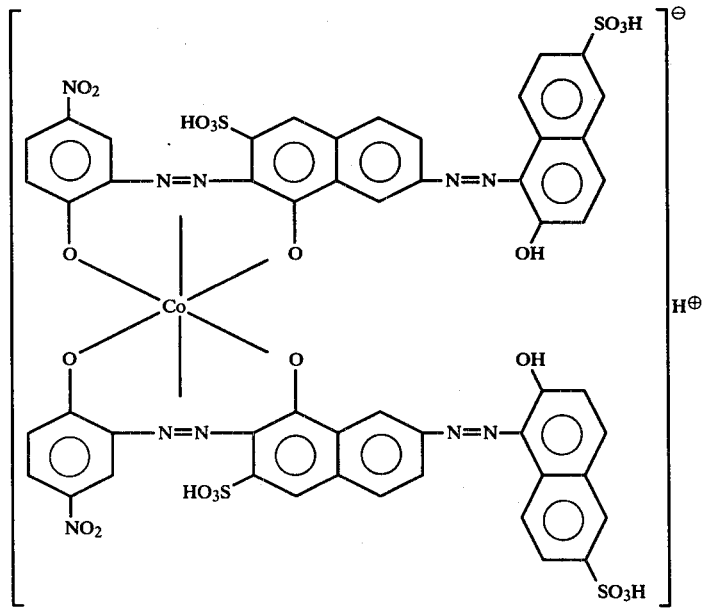

EXAMPLE 5

24.2 parts of the dyestuff of the formula

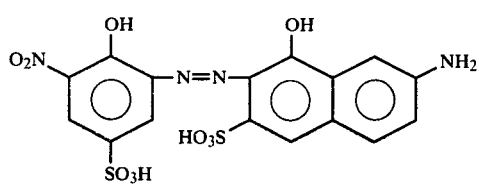

and 26.3 parts of the dyestuff of the formula

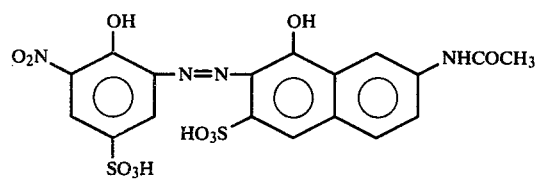

are both suspended in 500 parts of water, reacted with 11.5 parts of chromium(II)acetate and stirred for 6 hours at 100° at a pH between 4 and 5. After cooling to 10°, 30 parts of 30% hydrochloric acid are added thereto and the reaction mixture is diazotized by the dropwise addition of 13 parts by volume of a 4 N sodium nitrite solution. On completion of diazotization, 5.5 parts p-cresol dissolved in 20 parts of water and 7 parts of a 30% sodium hydroxide solution are added.

Finally, the pH is adjusted to 11 by the addition of sodium hydroxide. After coupling is completed, the pH is adjusted to 7 with hydrochloric acid and the dyestuff is dried in vacuo. After drying and grinding, a black powder in sodium salt form is obtained which gives dyeings on leather from a weakly acid bath of even grey shades having notable light fastness.

EXAMPLE 6

By replacing the dyestuffs used in Example 5 with the dyestuffs of the formulae

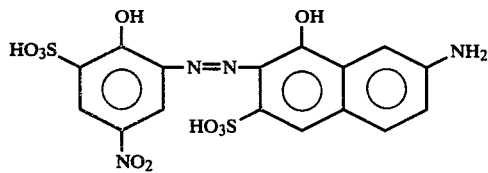

and

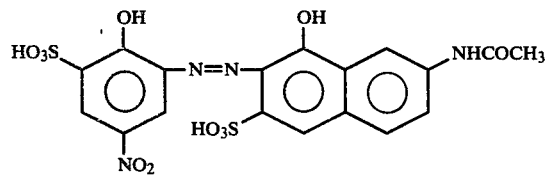

and following the procedure of Example 5, a dyestuff is obtained which gives dyeings on leather of slightly yellowish-grey shades.

EXAMPLE 7

20 parts of 2-amino-1-hydroxy-6-nitrobenzene-4-sulphonic acid and 5 parts of 2-amino-1-hydroxy-4-nitrobenzene-6-sulphonic acid are diazotized in the usual manner and are coupled in alkaline medium with 12 parts of 2-amino-8-hydroxynaphthalene-6-sulphonic acid and 14 parts of 2-acetylamino-8-hydroxynaphthalene-6-sulphonic acid stirred in 200 parts of water. The mixture of monoazo dyestuffs of the formulae

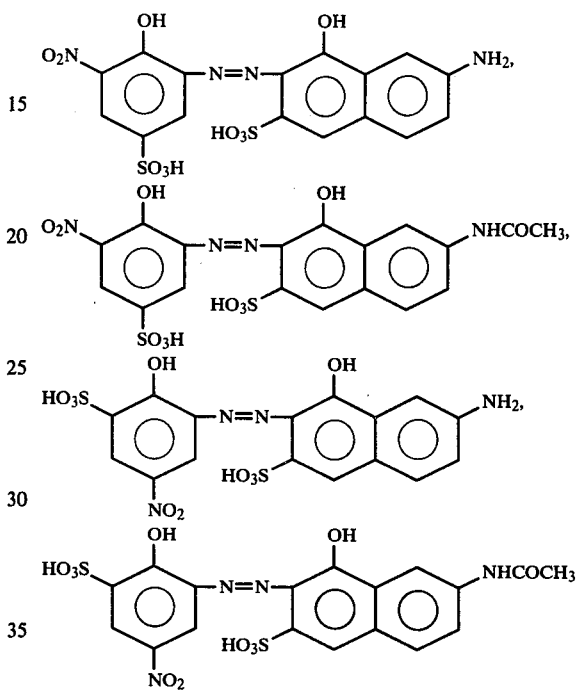

are reacted with 11.5 parts of chromium(II)acetate and stirred for 6 hours at 100° at a pH between 4 and 5. After cooling to 10°, 30 parts of 30% hydrochloric acid are added thereto and diazotization is effected by the dropwise addition of 13 parts by volume of 4 N sodium nitrite solution. On completion of diazotization 5.5 parts p-cresol dissolved in 20 parts water and 7 parts of 30% sodium hydroxide solution are added thereto. Finally, the pH is adjusted to 11 by the addition of sodium hydroxide. On completion of coupling, the pH is adjusted to 7 with hydrochloric acid and the dyestuff is salted out with potassium chloride. After drying and grinding, a dyestuff, which is a mixture of the sodium and potassium salt forms and is black powder, is obtained which gives dyeings on leather from a weakly acid bath of even grey shades having notable fastness properties.

In the following Table further dyestuffs, which may be prepared in analogy with the procedure described in any one of Examples 1 to 4, are given and are characterised by the diazo component derived from the amine X'—A—NH$_2$ middle component and the coupling component BH and the complex forming metal. Furthermore, the shade of dyeing on leather is given in each case.

TABLE

| Example No. | X'—A—NH$_2$ | Middle Component | B—H | Metal Complex | Shade on leather |
|---|---|---|---|---|---|
| 8 | 2-amino-1-hydroxy-6-nitrobenzene-4-sulphonic acid | 2-amino-8-hydroxy-napthalene-6-sulphonic acid | 4-chloro-1-hydroxy-benzene | Cr | grey |

TABLE-continued

| Example No. | X'—A—NH₂ | Middle Component | B—H | Metal Complex | Shade on leather |
|---|---|---|---|---|---|
| 9 | " | " | 2,4-dimethyl-1-hydroxybenzene | Cr | grey |
| 10 | " | " | 1,3-diaminobenzene | Cr | grey |
| 11 | " | " | 1,3-diamino-4-methylbenzene | Cr | grey |
| 12 | " | " | 3'-hydroxy-2-methyl-1,1'-diphenylamine | Cr | brown |
| 13 | " | " | acetoacetanilide | Cr | grey |
| 14 | " | " | ethyl acetoacetate | Cr | grey |
| 15 | 2-amino-1-hydroxy-4-nitrobenzene | " | 2-hydroxynaphthalene-3,6-disulphonic acid | Co | bluish-grey |
| 16 | 2-amino-1-hydroxy-4-nitrobenzene-6-sulphonic acid | " | 1-hydroxy-4-methylbenzene | Cr | grey |
| 17 | " | " | 4-chloro-1-hydroxybenzene | Cr | grey |
| 18 | 2-amino-1-hydroxy-4-nitrobenzene-6-sulphonic acid | 2-ammino-8-hydroxy-naph-thalene-6-sulphonic acid | acetoacetanilide | Cr | grey |
| 19 | " | 2-amino-5-hydroxy-naphthalene-7-sulphonic acid | " | Cr | black |
| 20 | " | " | 1-hydroxy-4-methylbenzene | Cr | grey |
| 21 | 2-amino-1-hydroxy-6-nitrobenzene-4-sulphonic acid | " | " | Cr | grey |
| 22 | 2-amino-1-hydroxy-4,6-dinitrobenzene | 2-amino-8-hydroxy-naphthalene-6-sulphonic acid | " | Cr | grey |
| 23 | " | " | " | Co | grey |
| 24 | " | " | acetoacetanilide | Cr | green |
| 25 | " | " | " | Co | green |
| 26 | 2-amino-1-hydroxy-benzene-4-sulphonic acid | " | " | Cr | grey |
| 27 | " | " | " | Co | violet |
| 28 | " | " | 1-hydroxy-4-methylbenzene | Cr | violet |
| 29 | " | " | " | Co | violet |

EXAMPLE 30

48.4. Parts of the monoazo dyestuff obtained from diazotized 2-amino-1-hydroxy-6-nitrobenzene-4-sulphonic acid and 2-amino-8-hydroxynaphthalene-6-sulphonic acid are suspended in 400 parts of ethylene glycol and stirred with 26.7 parts chromium(III) chloride hexahydrate at 120° until the starting material dyestuff is no longer detectable. The suspension of the 1:1 chromium complex dyestuff obtained is reacted with 52.6 parts of the monoazo dyestuff obtained from diazotized 2-amino-1-hydroxy-6-nitrobenzene-4-sulphonic acid and 2-acetylamino-8-hydroxynaphthalene-6-sulphonic acid and 200 parts by volume of a 2 N sodium carbonate solution and stirred at 90° for 2 hours. After the reaction is completed the dyestuff solution is cooled to 10°, the pH is adjusted to 1 with 30% hydrochloric acid and the dyestuff is diazotized by the dropwise addition of 25 parts by volume of a 4 N soidum nitrite solution, the pH being maintained between 1 and 2 by the addition of further hydrochloric acid. On completion of the diazotization, 11 parts of 1-hydroxy-4-methylbenzene dissolved in 50 parts of water and 10 parts of 30% sodium hydroxide solution are added thereto. The pH is adjusted to 11 by the addition of sodium hydroxide and the reaction mixture is stirred for 1 hour. The pH of the obtained dyestuff solution is adjusted to 7 with hydrochloric acid and the obtained dyestuff which is in sodium salt form is dried in vacuo. After grinding, the dyestuff obtained which is a black powder and which in the free acid form corresponds to the formula

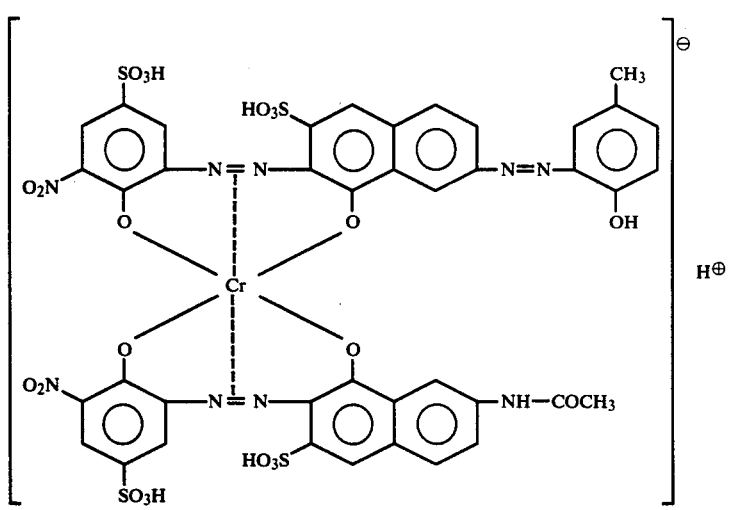
gives dyeings on leather from a weakly acid bath having notable light-fast even grey shades.
Among the preferred dyes are:
(i) Mixtures of 1:2 metal complexes of the dyes which, in free acid form, have the formulae
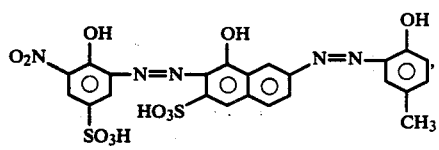
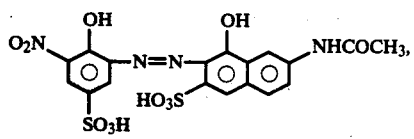
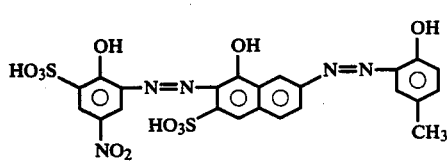
and
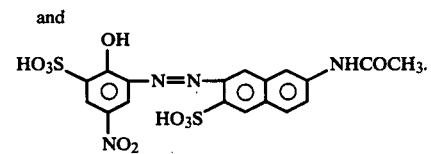
(ii) Mixtures of 1:2 metal complexes of the dyes which, in free acid form, have the formulae
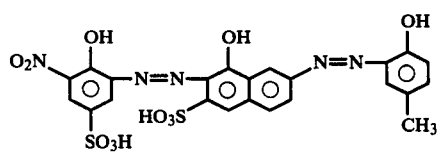
and
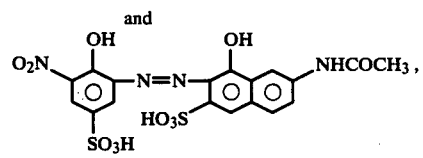
(iii) 1:2 metal complexes which, in free acid form, have the formula
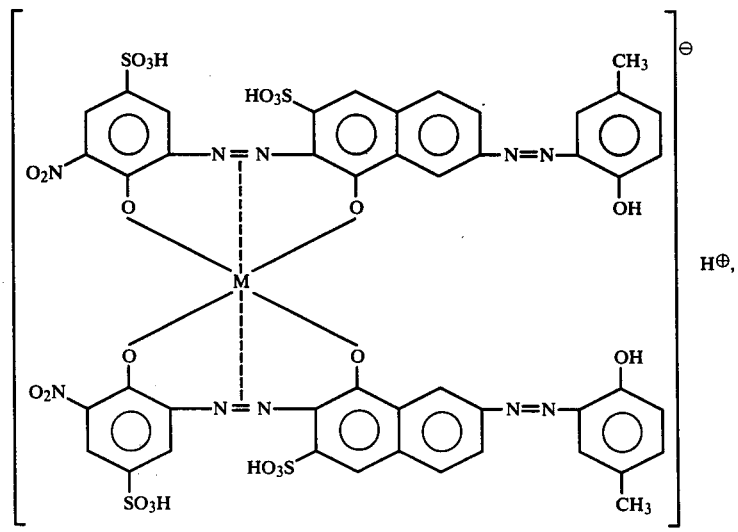

wherein M is as defined above.

(iv) 1:2 metal complexes which, in free acid form, have the formula

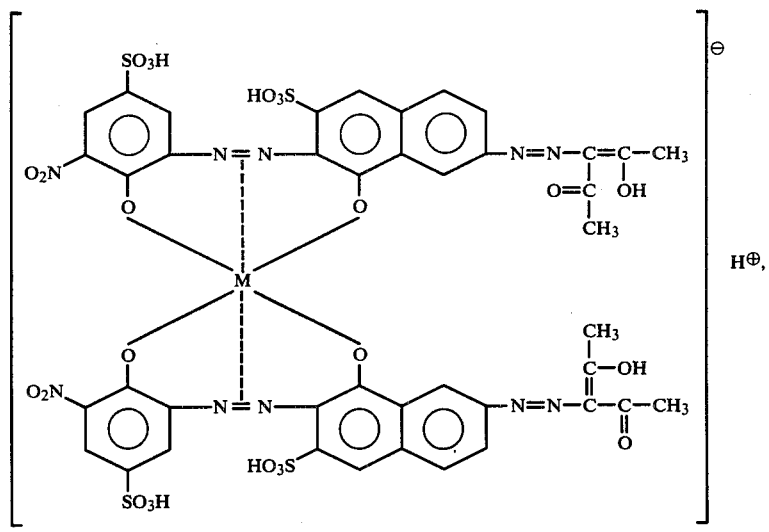

wherein M is as defined above.

APPLICATION EXAMPLE A

100 Parts of newly tanned and neutralised chromium grain leather are milled for 30 minutes in the dyebath in a liquor consisting of 250 parts of water at 55° and 0.5 parts of the dyestuff of Example 1. The leather is treated for a further 30 minutes in the same bath with 2 parts of an anionic fat-liquor based on sulphonated train oil, dried and treated in the usual manner. The dyeing obtained is of an even grey shade.

APPLICATION EXAMPLE B

100 Parts of calf suede are milled for 4 hours in a bath with 1000 parts of water and 2 parts of ammonia. The milled calf leather is subsequently dyed in a dyebath containing 500 parts of water at 55°, 2 parts of ammonia, 5 parts of the dissolved dyestuff of Example 1 for 1½ hours. In order to exhaust the dyebath, 4 parts of formic acid (85%) are slowly added, and dyeing continues until the dyestuff has been fixed completely. The suede leather is rinsed, dried and treated in the normal manner and after buffing the suede side is of an even grey shade.

APPLICATION EXAMPLE C

100 Parts of lamb's leather, chromium-vegetable tanned, and 5 parts of the dyestuff of Example 1 are milled for 45 minutes in the dyebath in a liquor consisting of 1000 parts of water at 55° and 1.5 parts of an anionic emulsion of spermaceti oil, and the dyestuff is fixed on the leather by slowly adding 5 parts of formic acid (85%) over 30 minutes. After the usual drying and treatment processes, a leather is obtained of an even grey shade.

APPLICATION EXAMPLE D

A solution of 20 parts of the dyestuff of Example 1 in 847 parts of water, 150 parts of ethylene glycol and 3 parts of formic acid (85%) is applied by spraying, plushing and coating to the grain side of a buffed, combination-tanned cow hide. The leather is dried and treated under mild conditions. A dyeing of a grey shade is obtained.

In analogous manner to the procedure given above in Examples A to D, the dyes of Examples 2 to 30 may also be used to dye leather.

What is claimed is:

1. A complex of the formula

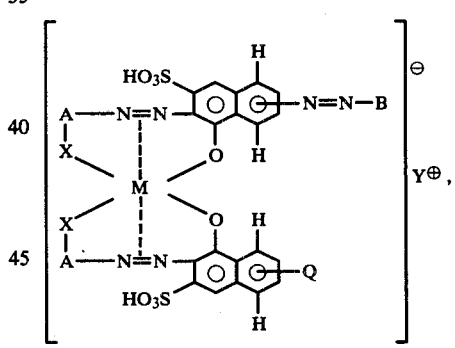

or a salt thereof,
or a mixture of such complexes in free acid or salt form, wherein each A is independently 1,2-phenylene; 1,2-phenylene substituted by 1 or 2 substituents each of which is independently $C_{1-4}$alkyl, $C_{1-4}$alkoxy, halo, nitro, sulfo or carboxy; 1,2-naphthylene or 1,2-naphthylene substituted by 1 or 2 substituents each of which is independently $C_{1-4}$alkyl, $C_{1-4}$alkoxy, halo, nitro, sulfo or carboxy, Q is —N=N—B, formamido or ($C_{1-4}$alkyl)carbonylamino, each X is independently —O— or —COO—, each B is independently a coupling component radical selected from substituted phenyl each substituent of which is independently hydroxy, —$NR_1R_2$, $C_{1-4}$alkyl, $C_{1-4}$alkoxy, halo, acetamido or sulfo, with the proviso that at least one substituent is hydroxy or —$NR_1R_2$;

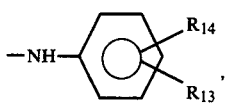 or 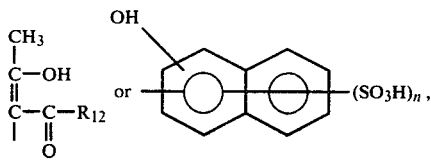, wherein $R_1$ is hydrogen, $C_{1-6}$alkyl or $C_{2-4}$hydroxyalkyl,
$R_2$ is hydrogen, $C_{1-6}$alkyl, phenyl, ($C_{1-6}$alkyl)phenyl or $C_{2-4}$hydroxyalkyl,
$R_{12}$ is $C_{1-4}$alkyl, $C_{1-4}$alkoxy or

—NH—⟨R_{14}, R_{13}⟩, wherein $R_{13}$ is hydrogen, $C_{1-4}$alkyl, $C_{1-4}$alkoxy, chloro or sulfo, and
$R_{14}$ is hydrogen, chloro or $C_{2-4}$alkyl, and
n is 0, 1 or 2, with the proviso that when Q is formamido or ($C_{1-4}$alkyl)carbonylamino, B is substituted phenyl each substituent of which is independently hydroxy, —$NR_1R_2$, $C_{1-4}$alkyl, $C_{1-4}$alkoxy, halo, acetamido or sulfo, with the proviso that at least one substituent is hydroxy or —$NR_1R_2$, M is a metal forming 1:2 metal complexes, and
$Y^⊕$ is hydrogen or a non-chromophoric cation.

2. A complex according to claim 1, or a salt thereof, or a mixture of such complexes in free acid or salt form, wherein M is chromium, cobalt or iron.

3. A complex according to claim 1, or a salt thereof, or a mixture of such complexes in free acid or salt form, wherein each —A—X— is independently

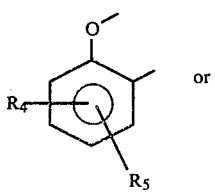 or

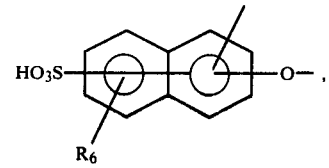, wherein $R_4$ is hydrogen, chloro, $C_{1-4}$alkyl, $C_{1-4}$alkoxy, sulfo or nitro,
$R_5$ is hydrogen, chloro, $C_{1-4}$alkyl, sulfo or nitro, and
$R_6$ is hydrogen or nitro.

4. A complex according to claim 3, or a salt thereof, or a mixture of such complexes in free acid or salt form, wherein not more than one of $R_4$ and $R_5$ is sulfo.

5. A complex according to claim 4 having the formula

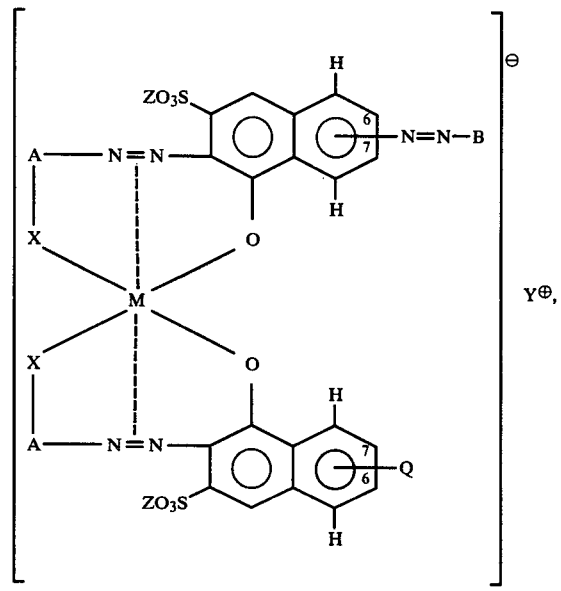

or a mixture of such complexes,
wherein each —A—X— is independently

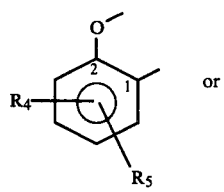

or

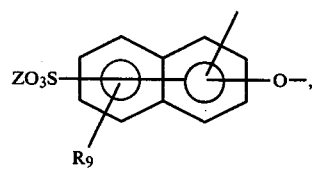, wherein $R_4$ is hydrogen, chloro, $C_{1-4}$alkyl, $C_{1-4}$alkoxy, —$SO_3Z$ or nitro,
$R_5$ is hydrogen, chloro, $C_{1-4}$alkyl, —$SO_3Z$ or nitro, with the proviso that not more than one of $R_4$ and $R_5$ is —$SO_3Z$, and
$R_6$ is hydrogen or nitro, Q is —N═N—B, formamido or (C$_{1-4}$alkyl)carbonylamino, each B is independently a coupling component radical of the formula

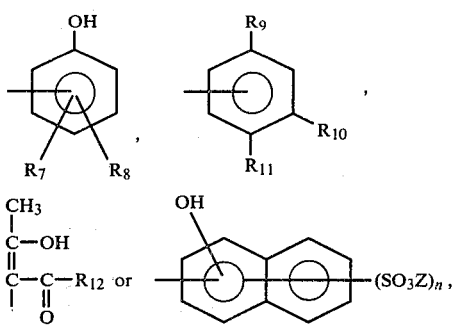

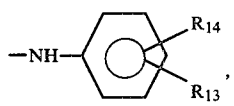 or

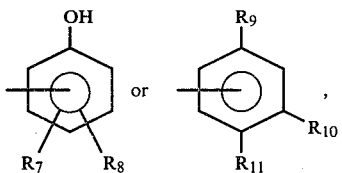, wherein R$_7$ is hydrogen, C$_{1-4}$alkyl, C$_{1-4}$alkoxy, chloro or acetamido, R$_8$ is hydrogen, chloro or C$_{1-4}$alkyl, R$_9$ is hydroxy or —NH$_2$, R$_{10}$ is hydroxy, —NH$_2$, anilino or toluidino, R$_{11}$ is hydrogen, —SO$_3$Z or C$_{1-4}$alkyl, R$_{12}$ is C$_{1-4}$alkyl, C$_{1-4}$alkoxy or

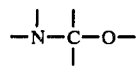, wherein R$_{13}$ is hydrogen, C$_{1-4}$alkyl, C$_{1-4}$alkoxy, chloro or —SO$_3$Z, and R$_{14}$ is hydrogen, chloro or C$_{2-4}$alkyl, and n is 0, 1 or 2, with the proviso that when Q is formamido or (C$_{1-4}$alkyl)carbonylamino, B is M is a metal forming 1:2 metal complexes, Y$^⊕$ is hydrogen or a non-chromophoric cation, and each Z is independently hydrogen or a non-chromophoric cation.

6. A complex according to claim 5, or a mixture of such complexes
wherein each
Z is independently a non-chromophoric cation when Y$^⊕$ is a non-chromophoric cation.

7. A complex according to claim 6, or a mixture of such complexes,
wherein
Y$^⊕$ is hydrogen, lithium, sodium, potassium or N$^⊕$(R$_x$)$_4$, and
each Z is independently hydrogen, lithium, sodium, potassium or N$^⊕$(R$_x$)$_4$, with the proviso that each Z is independently lithium, sodium, potassium or N$^⊕$(R$_x$)$_4$ when Y$^⊕$ is lithium, sodium, potassium or N$^⊕$(R$_x$)$_4$,
wherein each R$_x$ is independently hydrogen, C$_{1-3}$alkyl or C$_{2-4}$hydroxyalkyl, with the provisos that at least one R$_x$ is hydrogen or C$_{1-3}$alkyl and that the cation is free of $$-\overset{|}{\underset{|}{N}}-\overset{|}{C}-O-$$

radicals.

8. A complex according to claim 7, or a mixture of such complexes,
wherein
Y$^⊕$ is hydrogen, sodium or potassium, and
each Z is independently hydrogen, sodium or potassium, with the proviso that each Z is independently sodium or potassium when Y$^⊕$ is sodium or potassium.

9. A complex according to claim 5, or a mixture of such complexes,
wherein M is chromium, cobalt or iron.

10. A complex according to claim 9, or a mixture of such complexes,
wherein M is chromium or cobalt.

11. A complex according to claim 10, or a mixture of such complexes,
wherein M is chromium.

12. A complex according to claim 5, or a mixture of such complexes,
wherein each B is independently

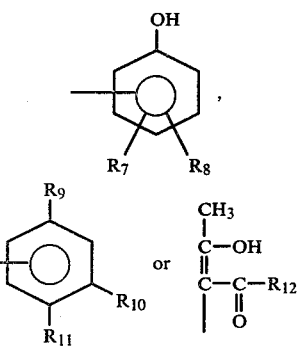

13. A complex according to claim 5, or a mixture of such complexes,
wherein Q is —N═N—B.

14. A complex according to claim 5, or a mixture of such complexes,
wherein Q is formamido or (C$_{1-4}$alkyl)carbonylamino.

15. A complex according to claim 5, or a mixture of such complexes,
wherein
R$_4$ is hydrogen, —SO$_3$Z or nitro, and
R$_5$ is hydrogen, chloro, methyl, —SO$_3$Z or nitro, with the proviso that not more than one of R$_4$ and R$_5$ is —SO$_3$Z.

16. A complex according to claim 15, or a mixture of such complexes,
wherein
R$_4$ is hydrogen, 3-SO$_3$Z or 3-nitro, and
R$_5$ is hydrogen, 5-chloro, 5-methyl, 5-SO$_3$Z, 4-nitro or 5-nitro, with the proviso that not more than one of R$_4$ and R$_5$ is —SO$_3$Z.

17. A complex according to claim 5, or a mixture of such complexes,
wherein
R$_7$ is C$_{1-4}$alkyl, C$_{1-4}$alkoxy, chloro or acetamido,
R$_8$ is hydrogen, chloro or methyl,
R$_{10}$ is —NH$_2$, anilino or toluidino, $R_{11}$ is hydrogen or —$SO_3Z$,
$R_{13}$ is hydrogen, methyl, methoxy or chloro,
$R_{14}$ is hydrogen, and
n is 0 or 1.

18. A complex according to claim 17, or a mixture of such complexes,
wherein each —A—X— is independently

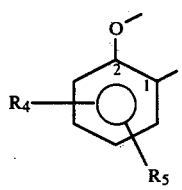

19. A complex according to claim 18, or a mixture of such complexes,
wherein each B is independently

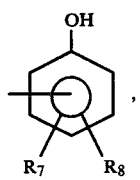

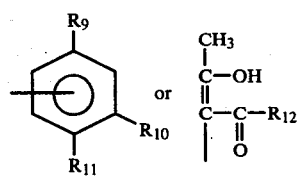

20. A complex according to claim 19, or a mixture of such complexes,
wherein each B is independently

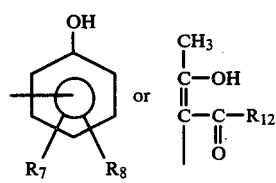

21. A complex according to claim 20, or a mixture of such complexes,
wherein each B is independently

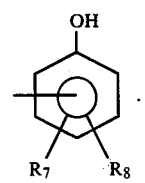

22. A complex according to claim 3 having the formula

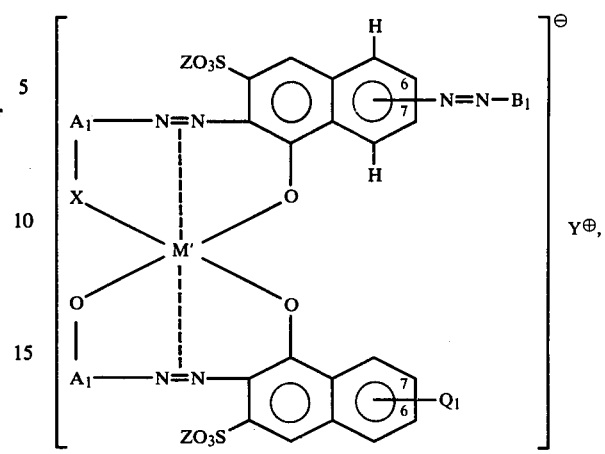

or a mixture of such complexes,
wherein each —$A_1$—O— is independently

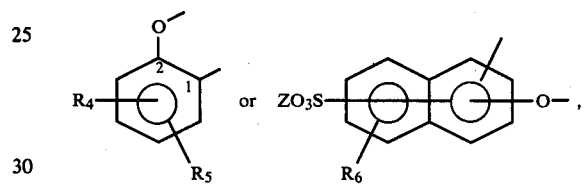

wherein
$R_4$ is hydrogen, chloro, $C_{1-4}$alkyl, $C_{1-4}$alkoxy, —$SO_3Z$ or nitro,
$R_5$ is hydrogen, chloro, $C_{1-4}$alkyl, —$SO_3Z$ or nitro, and
$R_6$ is hydrogen or nitro,
$Q_1$ is —N=N—$B_1$, formamido or ($C_{1-4}$alkyl)carbonylamino,
each $B_1$ is independently a coupling component radical of the formula

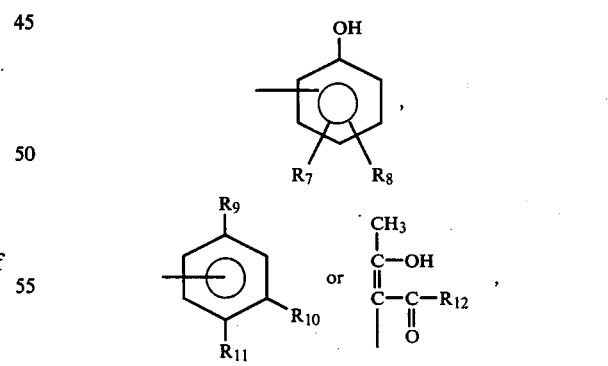

wherein
$R_7$ is hydrogen, $C_{1-4}$alkyl, $C_{1-4}$alkoxy, chloro or acetamido,
$R_8$ is hydrogen, chloro or $C_{1-4}$alkyl,
$R_9$ is hydroxy or —$NH_2$,
$R_{10}$ is hydroxy, —$NH_2$, anilino or toluidino,
$R_{11}$ is hydrogen, —$SO_3Z$ or $C_{1-4}$alkyl, and
$R_{12}$ is $C_{1-4}$alkyl, $C_{1-4}$alkoxy or

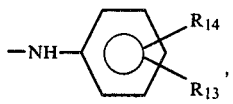

wherein
R₁₃ is hydrogen, C₁₋₄alkyl, C₁₋₄alkoxy, chloro or —SO₃Z, and
R₁₄ is hydrogen, chloro or C₂₋₄alkyl,
with the proviso that when Q₁ is formamido or (C₁₋₄alkyl)carbonylamino, B₁ is

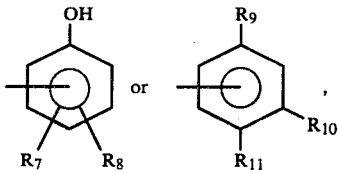

M' is chromium, cobalt or iron,
Y⊕ is hydrogen or a non-chromophoric cation, and
each Z is independently hydrogen or a non-chromophoric cation.

23. A complex according to claim 22, or a mixture of such complexes,
wherein each —A₁—O— is independently

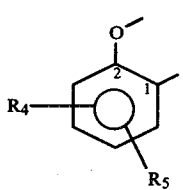

24. A complex according to claim 23, or a mixture of such complexes,
wherein
R₄ is hydrogen, —SO₃Z or nitro,
R₅ is hydrogen, chloro, methyl, —SO₃Z or nitro,
R₇ is C₁₋₄alkyl, C₁₋₄alkoxy, chloro or acetamido,
R₈ is hydrogen, chloro or methyl,
R₁₀ is —NH₂, anilino or toluidino,
R₁₁ is hydrogen or —SO₃Z,
R₁₃ is hydrogen, methyl, methoxy or chloro, and
R₁₄ is hydrogen.

25. A complex according to claim 24, or a mixture of such complexes,
wherein the two —A₁—O—'s are identical, and when Q₁ is —N=N—B₁, the two B₁'s are identical.

26. A complex according to claim 25, or a mixture of such complexes,
wherein
the two —A₁—O—'s are identical,
Q₁ is —N=N—B₁ or acetamido,
each B₁ is

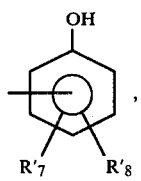

the two B₁'s being identical when Q₁ is —N=N—B₁, wherein
R₇' is C₁₋₄alkyl, C₁₋₄alkoxy, chloro or acetamido, and
R₈' is hydrogen, chloro or methyl.

27. A complex according to claim 24, or a mixture of such complexes,
wherein
—N=N—B₁ is in the 7-position of the naphthalene ring to which it is attached, and
Q₁ is in the 7-position of the naphthalene ring to which it is attached.

28. A complex according to claim 22, or a mixture of such complexes,
wherein the two —A₁—O—'s are identical, and when Q₁ is —N=N—B₁, the two B₁'s are identical.

29. A complex according to claim 5 having the formula

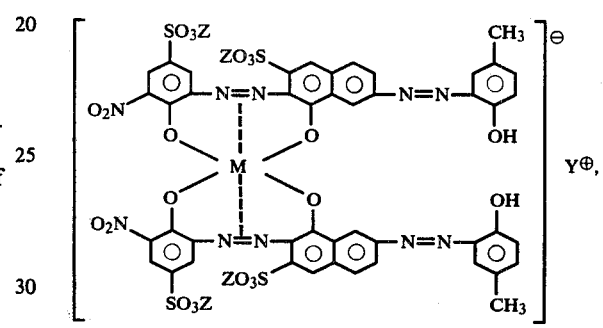

wherein
M is a metal forming 1:2 metal complexes,
Y⊕ is hydrogen or a non-chromophoric cation, and
each Z is independently hydrogen or a non-chromophoric cation.

30. A complex according to claim 29 wherein M is chromium.

31. A complex according to claim 5 having the formula

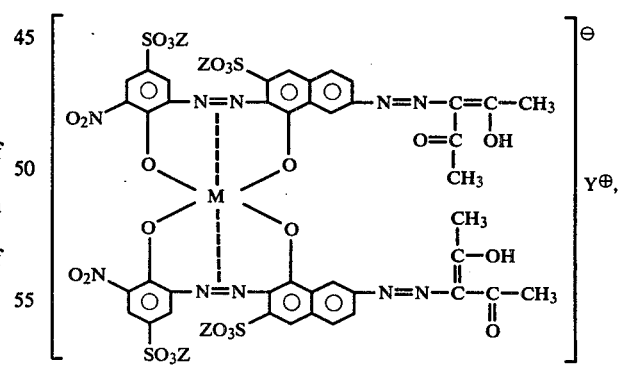

wherein
M is a metal forming 1:2 metal complexes,
Y⊕ is hydrogen or a non-chromophoric cation, and
each Z is independently hydrogen or a non-chromophoric cation.

32. A complex according to claim 31 wherein M is chromium.

33. A complex according to claim 5 having the formula

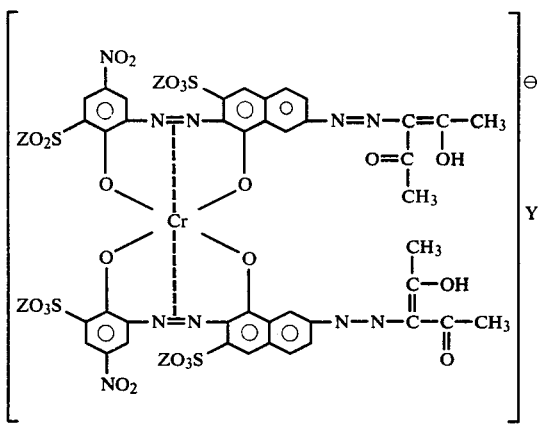

wherein
Y⊕ is hydrogen or a non-chromophoric cation, and
each Z is independently hydrogen or a non-chromophoric cation.

34. A dye composition comprising (a) a complex according to claim 1, or a salt thereof, or a mixture of such complexes in free acid or salt form, and (b) a complex of the formula

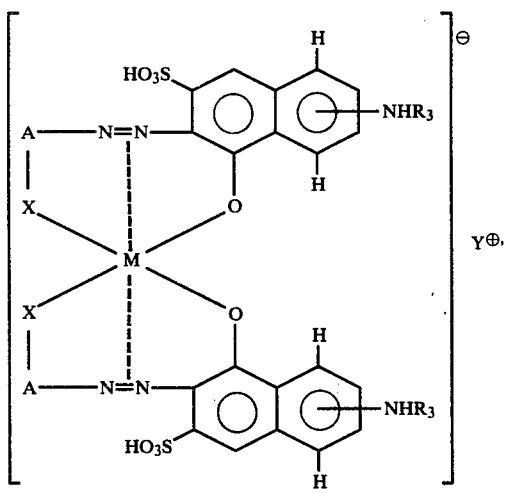

or a salt thereof, or a mixture of such complexes in free acid or salt form,
wherein
each A is independently 1,2-phenylene; 1,2-phenylene substituted by 1 or 2 substituents each of which is independently $C_{1-4}$alkyl, $C_{1-4}$alkoxy, halo, nitro, sulfo or carboxy; 1,2-naphthylene or 1,2-naphthylene substituted by 1 or 2 substituents each of which is independently $C_{1-4}$alkyl, $C_{1-4}$alkoxy, halo, nitro, sulfo or carboxy,
each $R_3$ is formyl or ($C_{1-4}$alkyl)carbonyl,
each X is independently —O— or —COO—,
M is a metal forming 1:2 metal complexes, and
Y⊕ is hydrogen or a non-chromophoric cation.

35. A dye composition according to claim 34 comprising a mixture of 1:2 metal complexes of the compounds of the formulae

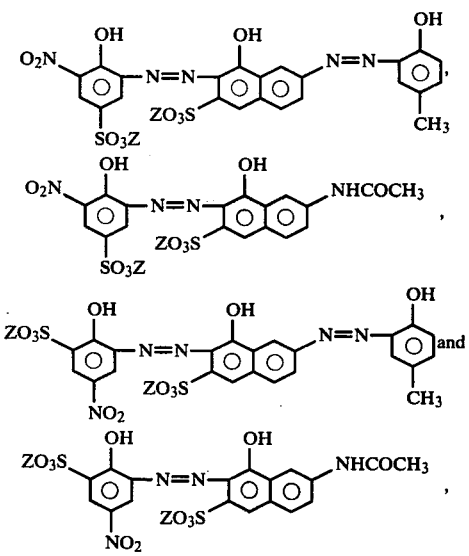

wherein each Z is independently hydrogen or a non-chromophoric cation.

36. A dye composition according to claim 34 comprising a mixture of 1:2 metal complexes of the compounds of the formulae

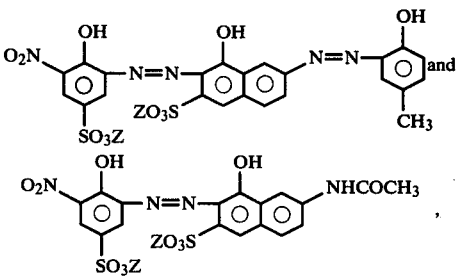

wherein each Z is independently hydrogen or a non-chromophoric cation.

37. A dye composition according to claim 34 wherein M is chromium.

* * * * *

UNITED STATES PATENT AND TRADEMARK OFFICE
CERTIFICATE OF CORRECTION

PATENT NO. : 4,150,942
DATED : April 24, 1979
INVENTOR(S) : Herbert Holliger and Heinz Wicki It is certified that error appears in the above-identified patent and that said Letters Patent are hereby corrected as shown below:

Abstract, between lines 8 and 9 insert -- each X is, independently, -O- or -COO-, --. Abstract, lines 13-14, delete ", each X is, independently, -O- or -COO-,". Column 2, line 15, the right-hand structural formula should read

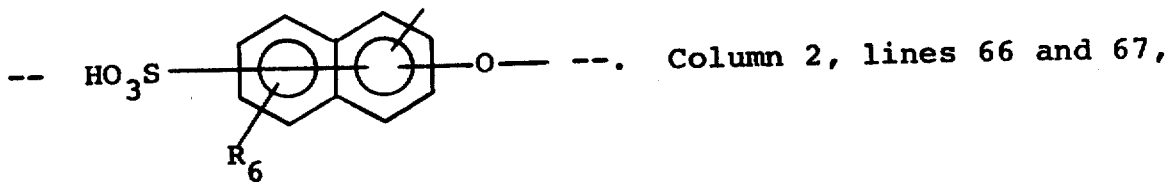

Column 2, lines 66 and 67, "mono-" (each occurrence) should read -- mono- and --. Column 3, line 25, "$(C_{1-4})$alkoxy," (first occurrence) should read -- $(C_{1-4})$-alkyl, --. Column 3, line 27, "$(C_{1-4})$alkoxy," should read -- $(C_{1-4})$alkyl, --. Column 11, line 37, after "hydroxynaphthalene" insert -- -6-sulfonic acid --. Column 22, line 60, that portion of the structural formula reading "$R_9$" should read -- $R_6$ --.

Signed and Sealed this

First Day of April 1980

[SEAL]

Attest:

SIDNEY A. DIAMOND

Attesting Officer

Commissioner of Patents and Trademarks